United States Patent
Schrubbe et al.

(10) Patent No.: US 9,374,948 B2
(45) Date of Patent: Jun. 28, 2016

(54) SYSTEMS AND METHODS FOR DELIMBING TIMBER

(76) Inventors: Carl D. Schrubbe, Waukesha, WI (US); Robert E. Hill, Jr., Midland, GA (US)

(*) Notice: Subject to any disclaimer, the term of this patent is extended or adjusted under 35 U.S.C. 154(b) by 1060 days.

(21) Appl. No.: 13/413,244

(22) Filed: Mar. 6, 2012

(65) Prior Publication Data

US 2013/0233448 A1 Sep. 12, 2013

(51) Int. Cl.
*A01G 23/083* (2006.01)
*A01G 23/095* (2006.01)
*A01G 23/097* (2006.01)

(52) U.S. Cl.
CPC ............ *A01G 23/095* (2013.01); *A01G 23/083* (2013.01); *A01G 23/097* (2013.01)

(58) Field of Classification Search
CPC . A01G 23/083; A01G 23/085; A01G 23/095; A01G 23/0955; A01G 23/099
See application file for complete search history.

(56) References Cited

U.S. PATENT DOCUMENTS

| 6,318,425 | B1* | 11/2001 | Niemi | 144/343 |
| 6,829,938 | B2* | 12/2004 | Blodgett | 73/579 |
| 7,882,864 | B2* | 2/2011 | Fargeot | 144/4.1 |
| 2009/0095378 | A1* | 4/2009 | Barker | 144/357 |
| 2010/0199621 | A1* | 8/2010 | Traster et al. | 56/10.7 |

* cited by examiner

*Primary Examiner* — Matthew G Katcoff
(74) *Attorney, Agent, or Firm* — Foster Pepper PLLC; Joel B. Ard; P. G. Scott Born

(57) ABSTRACT

A tree harvesting system includes a loader and a delimber. A camera system mounted on the delimber permits an operator to view an interaction area between a delimbing saw or toping saw and the tree being cut while the operator remains safely in a cab of the loader. The camera system provides image data to a display system located in the cab of the loader, and the image data may be viewed and/or processed to provide information about the interaction area, physical data about the tree, or some combination thereof. Advantageously, the tree harvesting system may allow for more accurate saw cuts at a preferred location of the tree, which in turn may result in a higher dollar amount and more efficient distribution of sticks to the mills.

13 Claims, 15 Drawing Sheets

SYSTEMS AND METHODS FOR DELIMBING TIMBER

FIELD OF THE INVENTION

The present invention generally relates to systems and methods for delimbing timber, and more specifically to systems and methods for delimbing timber in a field (i.e., logging) environment.

BACKGROUND OF THE INVENTION

A tree delimbing process involves removing the limbs (i.e., sticks or branches) of a tree (i.e., stick) from its stem. Generally, three conventional methods for delimbing are presently used in the logging industry. The conventional methods are (1) chainsaw delimbing, (2) pull-through delimbing, and (3) gate delimbing. Cutting branches during the delimbing process often results in a sudden release of stored energy, which may cause the branch and/or the entire tree to jump dangerously as the cut is underway or nearly complete. Moreover, one or more branches undergoing the delimbing process may be supporting the tree, and the tree can fall or roll when the branch is cut. For these reasons, delimbing is a skilled operation requiring careful safety considerations. The delimbing process includes at least one saw cut to top off an upper portion of the tree. For purposes of the present description herein, the terms "stick" and "tree" may be synonymous, but preferably the convention that will generally be applied below will be that a "tree" is not-yet-delimbed (field pre-processed) while a "stick" has been topped and delimbed (field post-processed).

After the delimbing process, the sticks are sent to a mill for further processing. To improve the overall efficiency of the logging process, many mills have strict specifications of what type of timber will be accepted for further processing. All mills have a specific minimum top size that is acceptable for customers. Mills that produce lumber have specifications that limit the amount of defects in trees and may also require a minimum top size. Some examples of defects include: knots, rot, crook, and sweep. Currently, a loader operator is approximately thirty (30) feet away from the delimber/saw and their vision is limited by the delimber/saw itself. When you combine the distance from the delimber/saw and the fact that the delimber/saw blocks the operator's vision in most cases, this makes it difficult for the operator to accurately determine where the tree should be cut to eliminate defects and meet the minimum top size.

In most cases, there is more than one minimum top size needed to process trees in a timber operation. A timber operation usually has several different products that require sorting. Each product may require a different minimum top size. Accordingly, accurate delimbing can result in greater mill acceptance, less waste, and more efficient mill processing.

Chainsaw delimbing is a manual process performed by one or more lumberjacks with a chainsaw. While the lumberjack has a close-up view of the branches and the tree top to line up the respective saw cuts, it must be appreciated that the terrain, weather, tree orientation and various other factors may minimize the likelihood that even a skilled lumberjack may achieve an ideal cut or at least do so repeatedly. Further, chain saws are inherently dangerous, thus the cost of a skilled lumberjack and potential injury implications of chainsaw delimbing make it a less-than-preferred process.

Pull-through delimbing involves either a stand-alone delimber or a trailer-mounted pull-through delimber. These delimbers have a set of pressure sensitive knives that close around the tree at which point a skidder or loader, respectively, pulls the tree through and the branches are cut off. In addition, these delimbers have a saw that can be selectively lowered to top off the tree.

FIG. 1 shows a conventional tree harvesting system 10 having a loader 12 and a delimber 14. The loader 12 includes a cab 16, a boom 18 and grapples 20 for lifting and holding large loads or single logs 22 while they are pulled or pushed through the delimber 14. The cab 16 houses an operator (not shown). Sticks may be placed on a rack 24. The configuration of the boom 18 permits the operator to be remotely and safely located in the cab 16 and away from the cutting areas during the delimbing process.

FIG. 2A shows the delimber 14 having a cradle structure or cradle frame 26 configured with a throat opening 28 that receives the log 22 (not shown). A plurality of knives 30 for cutting the branches are located proximate the throat opening 28. FIG. 2B shows the delimber 14 having a deployable saw 32 that pivots relative to the cradle frame 26 to cut the log 22. When not in use, the saw 32 may be rotated into a cavity formed in the cradle frame 26 so that the saw 32 will be protected from the elements.

When harvesting trees using the pull-through delimbing process, the operator, who is located in the cab of the loader, cannot see the point where the saw contacts the tree for the topping off process, which may result in sticks and/or tops that are poorly or incorrectly cut. The operator is removed from an interaction point of the saw and the tree by the nature of the equipment (e.g., the length of the boom). Most pull-through delimbers have a device for measuring the length of the tree after delimbing.

Gate delimbing involves a steel frame that is normally placed just before a landing. A grapple skidder pushes the tree backward through the gate to break off the majority of the limbs. While this may be a fast process and may avoid slush piling up at the landing, gate delimbing may result in unwanted breakage as well as poor quality delimbing.

BRIEF SUMMARY OF THE INVENTION

A tree harvesting system includes a loader and a delimber. A camera system mounted on the delimber permits an operator to view an interaction area between a delimbing saw or topping saw and the tree being cut while the operator remains safely in a cab of the loader. The camera system provides image data to a display system located in the cab of the loader, and the image data may be viewed and/or processed to provide information about the interaction area, physical data about the tree, or some combination thereof. Advantageously, the tree harvesting system may allow for more accurate saw cuts at a preferred location of the tree, which in turn may result in a higher dollar amount for the timber and more efficient distribution to the mills.

At least one embodiment of the tree harvesting system allows the operator to view a live feed from the camera mounted on the delimber/saw approximately three feet away directly above the point at which the saw cuts the tree from a monitor (LCD screen) in the loader. This allows the loader operator to accurately saw the tree at the most efficient point to remove any defect from the tree. The monitor itself may have adjustable lines built in the screen that allows for determining minimum top size. The adjustable lines may allow up to four different individual settings for top size. By way of example, a certain mill may require an eight inch minimum top to meet their specification. The monitor allows a loader operator to adjust the lines on the screen so the corresponding cut achieves an eight inch top or at least fairly close to an eight inch top. Once the operator makes the adjustment, he can efficiently cut trees by pulling the tree through the delimber/saw until the stem fits between the lines on the screen.

In one aspect of the present invention, a pull-through delimbing system for a tree harvester includes a saw, a camera, a display system, and a processor. The camera may be arranged to capture an interaction point between the saw and a portion of the tree. The display system receives image data from the camera. And, the processor receives the image data to determine at least one physical parameter related to the portion of the tree that allows an operator of the delimbing system to choose where to cut the portion of the tree.

In another aspect of the invention, a method for delimbing a tree with a tree harvester includes the steps of (1) viewing, with a camera, an interaction point between a saw of the tree harvester and a portion of the tree to be harvested; (2) transmitting image data of the interaction point from the camera to a processor; (3) interpreting the image data with a processor; (4) displaying, on a display system that is remotely located from the camera, the processed image data; (5) determining, with the processor, at least one physical parameter of the tree to be harvested; (6) displaying data indicative of the at least one physical parameter of the portion of the tree to be harvested; and (7) based on the displayed interaction point and the displayed data, cutting the portion of the tree to be harvested at a selected location.

BRIEF DESCRIPTION OF THE DRAWINGS

Preferred and alternative embodiments of the present invention are described in detail below with reference to the following drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with tree harvesters and delimbing units to include the operating components used therein or therewith such as, but not limited to, delimbing heads, grappling arms, saws, knives, skids, loaders, platforms, booms, cabs, etc., various computing and/or processing systems to control various machine operations, and delimbing processes may not necessarily be shown or described in detail to avoid unnecessarily obscuring descriptions of the embodiments of the invention.

To address at least some of the aforementioned drawbacks of conventional tree harvesting systems and processes, and in particular pull-through delimbers and processes, at least one aspect of the present invention involves a closer involvement between the operator inside the loader and the delimber in order to achieve improved control over an interaction area between the topping saw and the tree. In one embodiment, the delimber may be fitted with a camera imaging and transmission system. The camera provides real-time images of the interaction area (i.e., where the saw is about to cut off a top portion of the tree) to the operator. The images are visible on a display system located in the loader, and thus the interaction area is remotely viewable on the display system by the operator in the cab. Accordingly, the operator may make real-time decisions as to where to cut the tree so as to achieve a desired length and/or diameter for the stick and/or the top portion of the tree.

Figure 1:
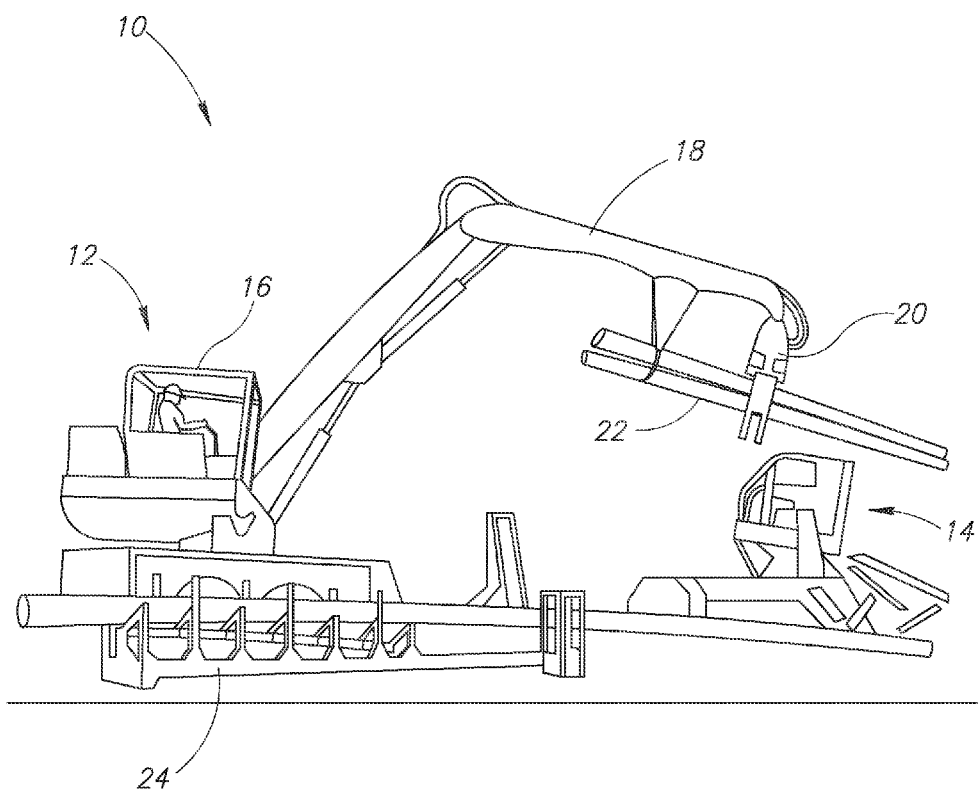
FIG. 1 is a perspective view of a prior-art tree harvesting system having a loader and pull-through delimber.
Figure 2A:
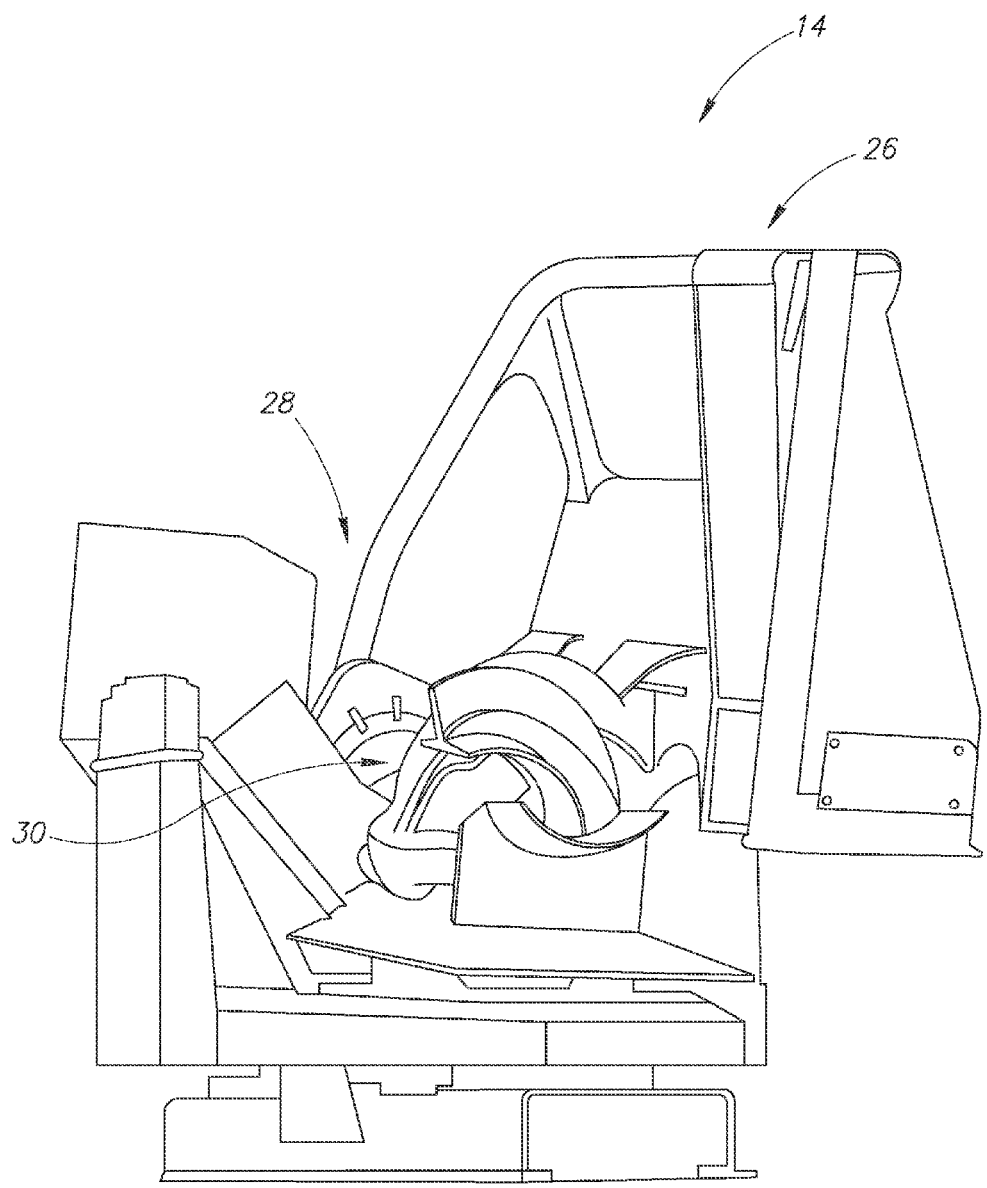
FIG. 2A is a perspective view of a prior-all delimber.
Figure 2B:
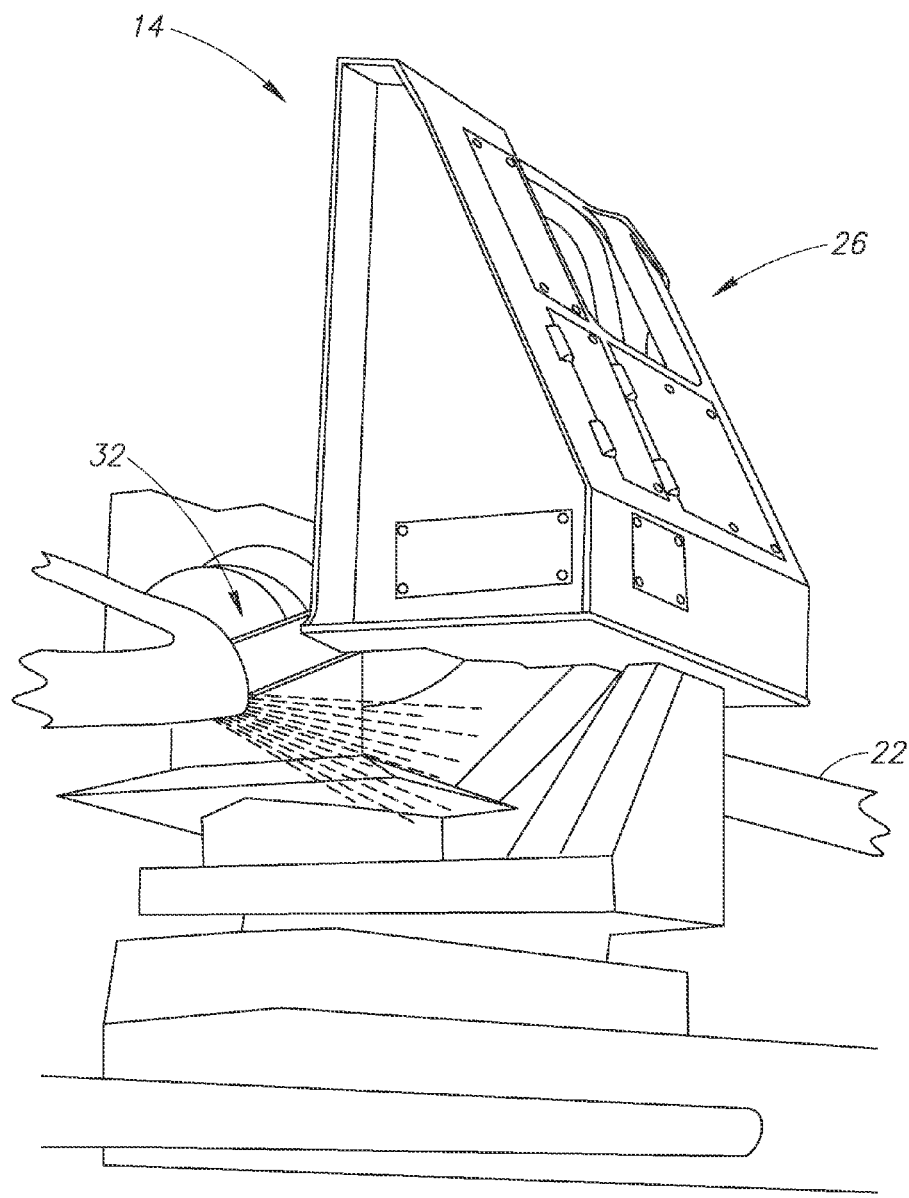
FIG. 2B is a perspective view of the prior-art delimber with a chain saw rotated into a cutting configuration.
Figure 3:
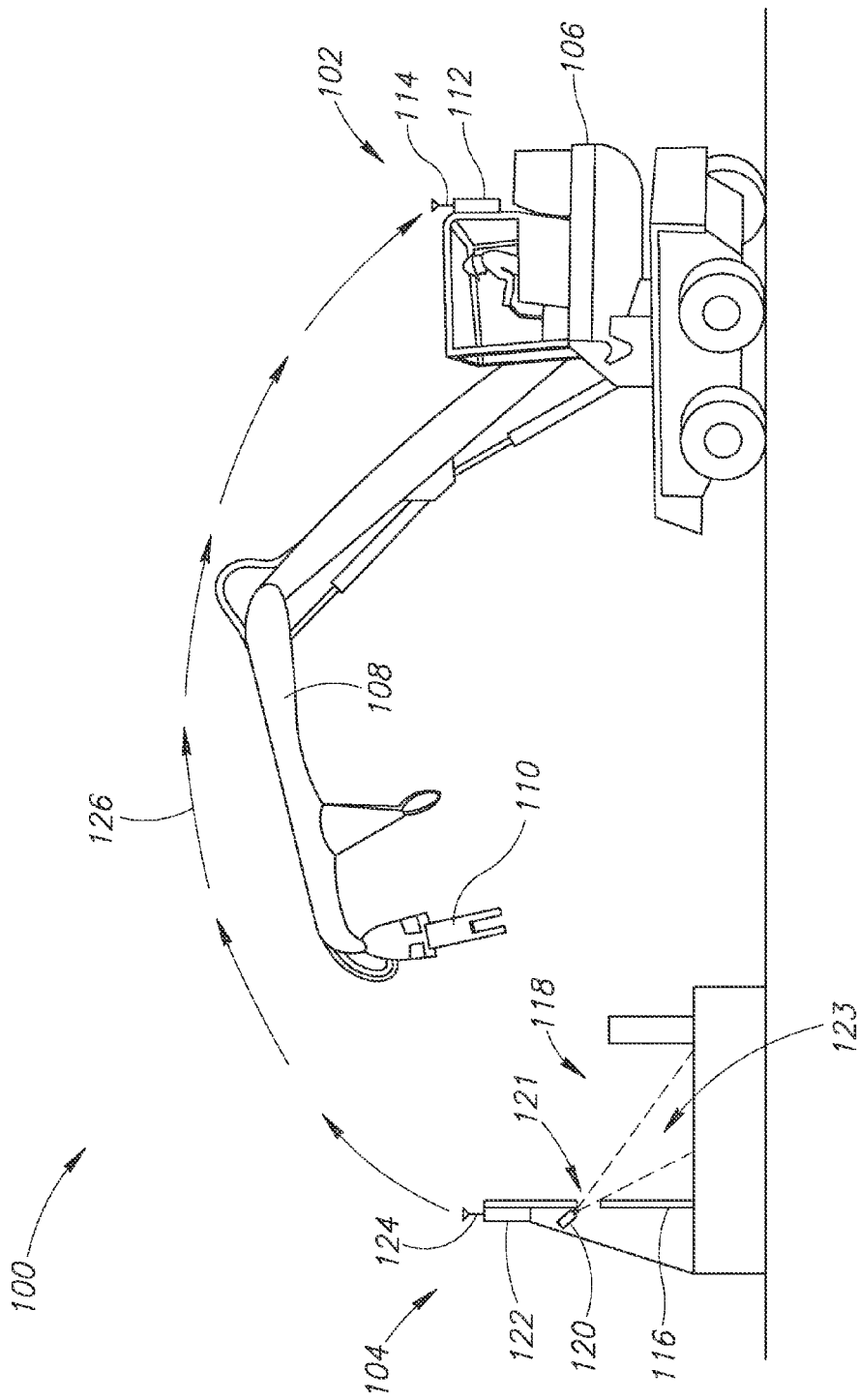
FIG. 3 is a schematic, side elevational view of a tree harvesting system according to an embodiment of the present invention.

FIG. 3 shows a tree harvesting system 100 having a loader 102 and a delimber 104 according to an embodiment of the present invention. The loader 102 includes a cab 106, a boom 108 and a grapple 110. The boom 108 is power-operated for extension and retraction. In one embodiment, the boom 108 is operable with a chain and sprocket system (not shown) powered by an electric or a hydraulic motor (not shown). The grapple 110 may be electrically or hydraulically powered, for example using coaxial cables or hydraulic hoses, respectively. Additional hydraulic hoses may be provided to supply hydraulic fluid to other components of the delimber 104.

The loader 102 further includes a display system 112 that may optionally have or be coupled to a receiver or transceiver 114. In one embodiment, the receiver 114 may take the form of a radio antenna for receiving encoded image data either directly from a remotely located camera or from a transmitter in communication with the camera. The display system 112 will be described in greater detail below.

The delimber 104 includes a delimber structure or cradle frame 116 with an opening or trough 118. A camera system 120 is coupled to the delimber 104 proximate an opening 121 formed in the delimber 104. An orientation of the camera system 120 with respect to the opening 121 allows the camera to have a desired field of view 123 into the trough 118. An electronic data box 122 may be coupled to the cradle frame 116 and be in electronic communication with the camera system 120. In one embodiment, the electronic data box 122 wirelessly provides radio signals 126 by way of a radio antenna 124 to the wireless receiver 114. As with the display system 112 in the loader 102, the camera system 120 and electronic data box 122 will be described in greater detail below.

Figure 4A:
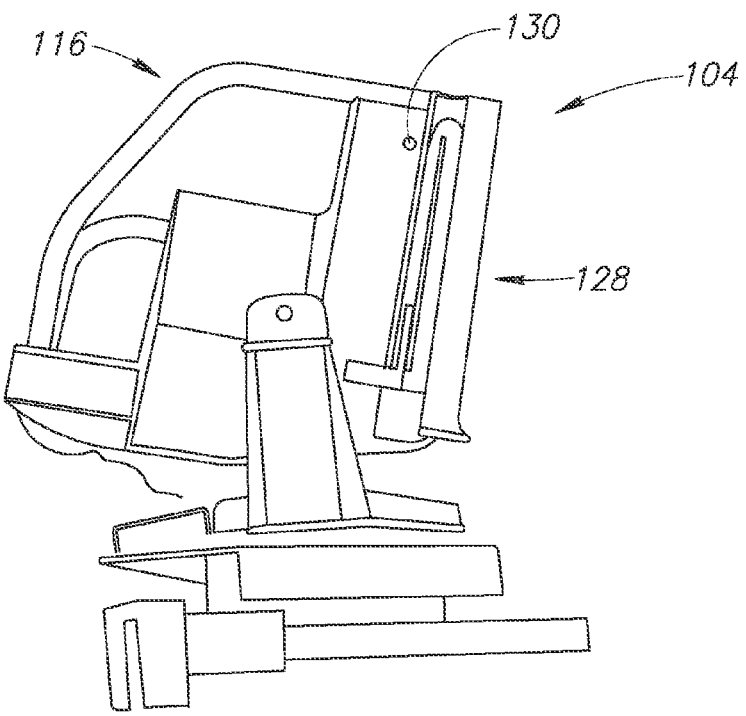
FIG. 4A is a delimber with an opening for a camera according to an embodiment of the present invention.
Figure 4B:
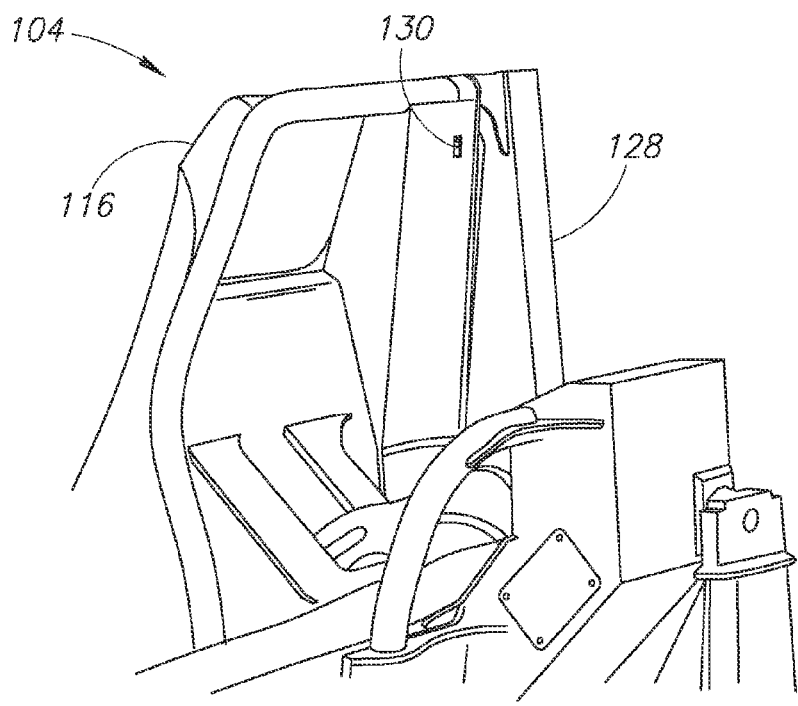
FIG. 4B is a perspective view of the delimber of FIG. 4B showing the opening according to an embodiment of the present invention.

FIGS. 4A and 4B show the delimber 104 having a saw 128 coupled to the cradle frame 116. When the saw 128 is rotated into a deployed or cutting position then an opening 130 provided in the cradle frame 116 permits the camera system 120 (FIG. 3) to have the desired field of view 123 (FIG. 3). A configuration of the opening 130 may be adjusted to be larger or at a desired angle to achieve the desired field of view 123.

Figure 5A:
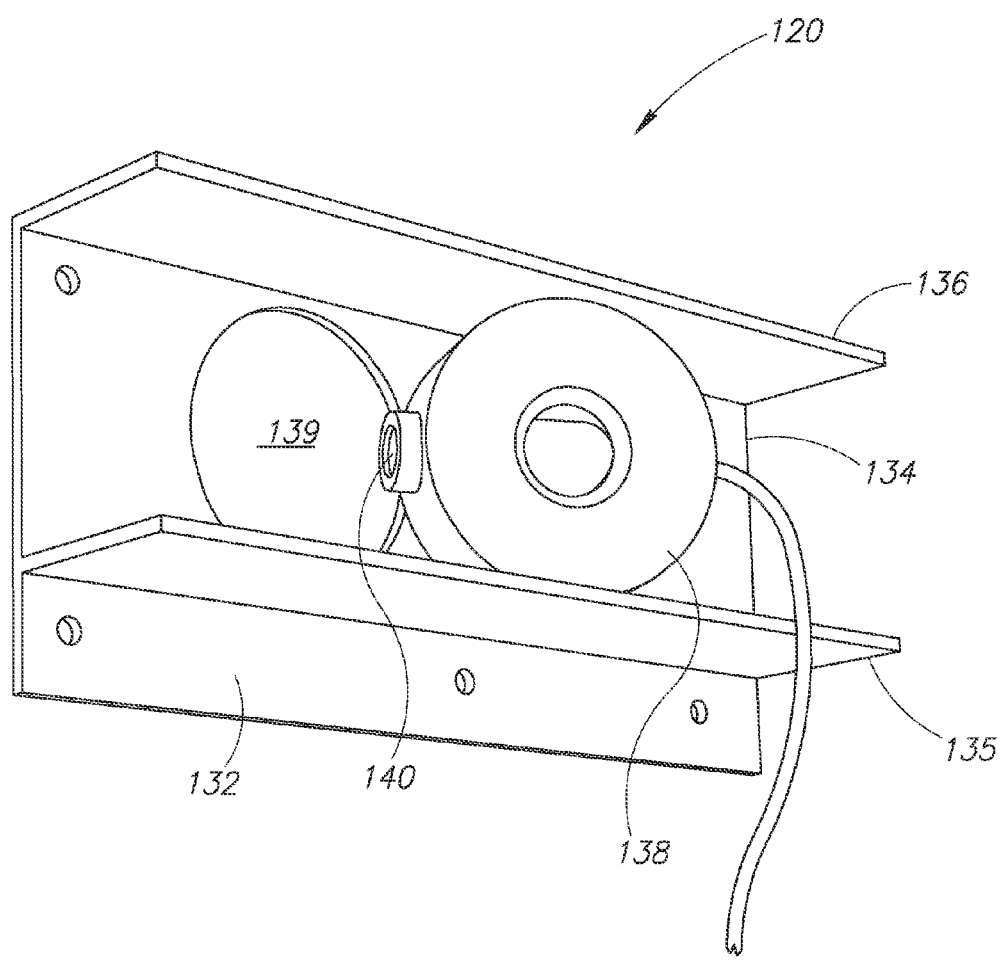
FIG. 5A is a perspective view of a camera arranged in a camera mount according to an embodiment of the present invention.

For purposes of clarity and logical operational flow, the components of the delimber 104 will be described in detail before the components of the loader 102. FIG. 5A shows the camera system 120 having a mounting bracket 132 attachable to a delimber wall (not shown, but is part of the cradle frame 116 described above) of the delimber 104. The mounting bracket 132 may include a mounting wall 134, a lower flange 135 and an upper flange 136. The flanges 135, 136 cooperate to closely receive a camera mount 138. In one embodiment, the camera mount 138 may generally take the form of an elastomeric ring or ball having properties (e.g., density, shape, etc.) that may be selected to provide vibration damping for a camera 140 received by the camera mount 138. An opening 139 in the mounting wall 134 permits the camera to have a field of view of the interaction point between the saw and the tree. The opening 139 is preferably aligned with the opening 130 (FIGS. 4A and 4B) in the delimber.

Figure 5B:
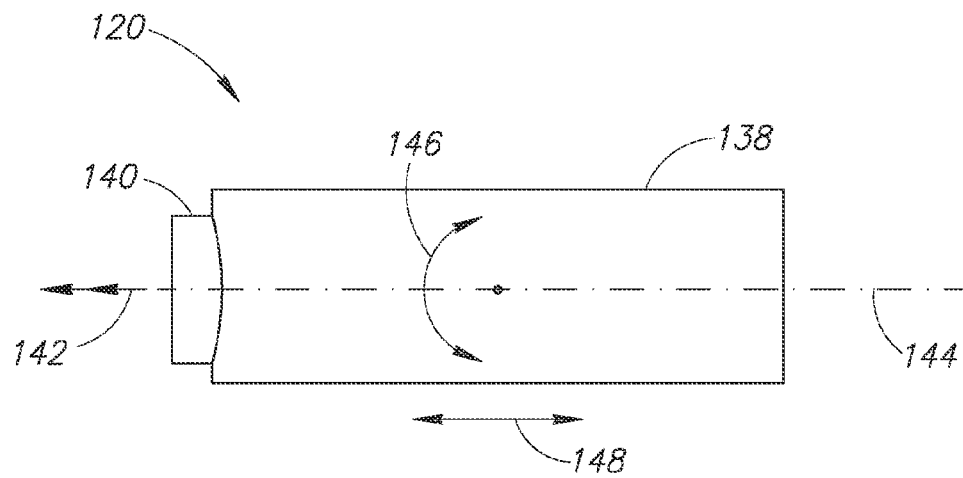
FIG. 5B is a top plan view of the camera of FIG. 5A showing various degrees of freedom for maneuvering the camera according to an embodiment of the present invention.
Figure 5C:
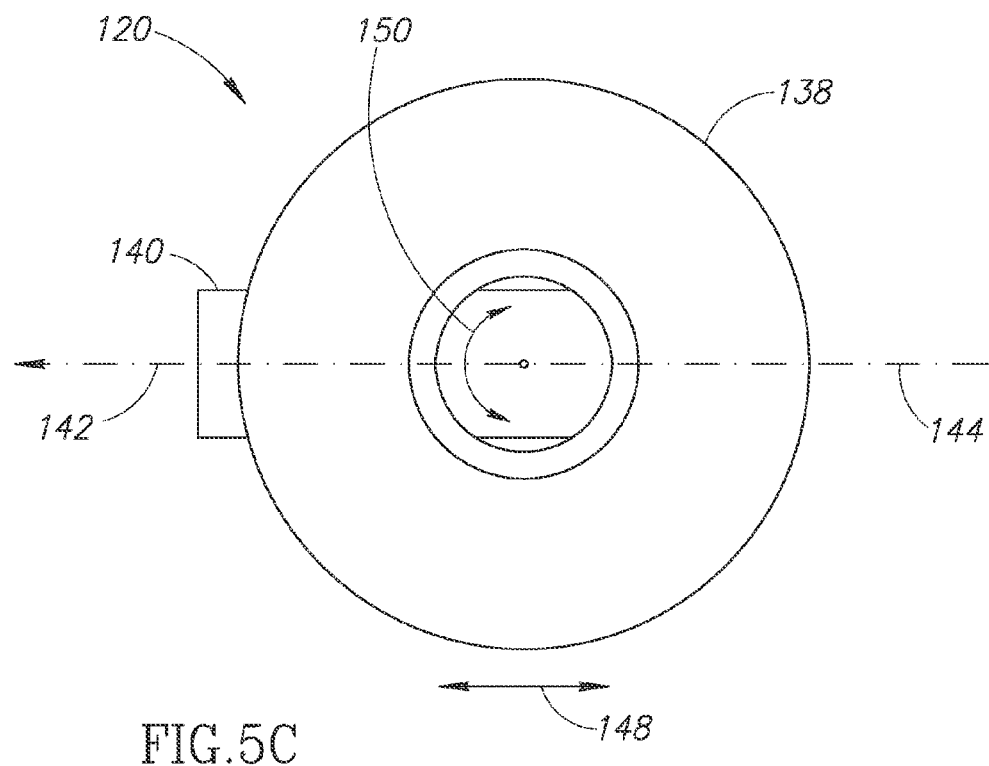
FIG. 5C is a side elevational view of the camera of FIG. 5A showing various degrees of freedom for maneuvering the camera according to an embodiment of the present invention.

FIG. 5B shows a top plan view of the camera system 120 without the mounting bracket 132. The camera 140 may be closely received in the camera mount 138 and be rotatable as indicated by the double-arrowed line 142 about a camera axis 144. Likewise, the camera mount 138 may be rotatable out-of-plane as indicated by an out-of-plane rotational arrow 146. For purposes of the illustrated embodiment, out-of-plane refers to a direction toward or away from the mounting wall 134 (FIG. 5A) of the mounting bracket 132. In addition, the camera mount 138 may be translated (e.g., slid relative to the mounting wall 134) as indicated by translation arrow 148. FIG. 5C is a side elevational view of the camera system 120, again without the mounting bracket 132. In the illustrated embodiment, an in-plane rotation of the camera mount 138 is depicted by an in-plane rotational arrow 150.

Figure 6A:
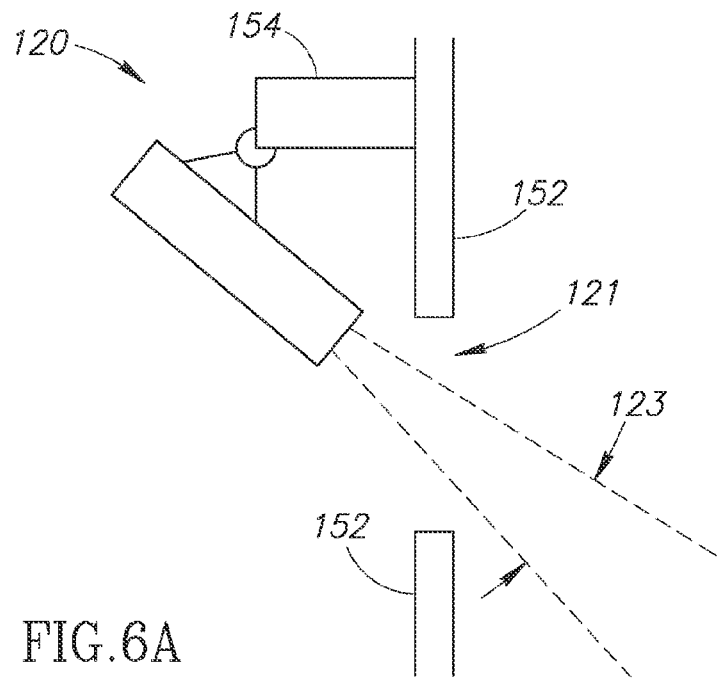
FIG. 6A is a schematic view of the camera of FIG. 5A mounted to a delimber with a desired field-of-view according to an embodiment of the present invention.

FIG. 6A schematically shows the camera system 120 mounted to a delimber wall 152 and offset therefrom with an offset mounting bracket 154. The offset mounting bracket 154 may take the form of mounting bracket 134 (FIG. 5A). The camera system 120 may be positionable relative to the delimber wall 152 either manually or remotely to achieve the desired field-of-view 123 through the opening 121 in the delimber wall 152.

Figure 6B:
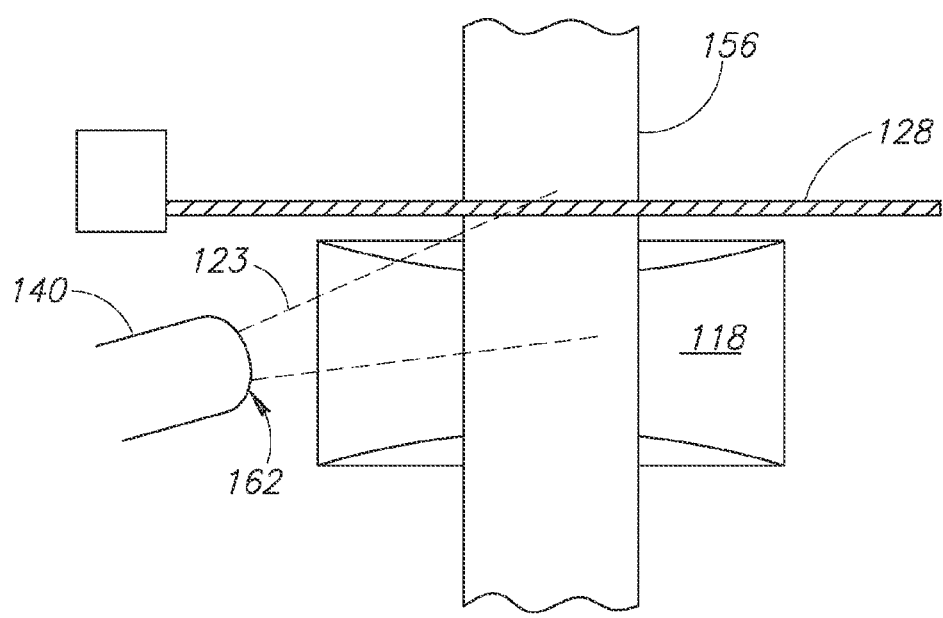
FIG. 6B is a schematic, overhead view of the camera of FIG. 5A having the desired field-of-view generally directed at an interaction point between the saw and the tree according to an embodiment of the present invention.

FIG. 6B shows the offset mounting bracket 154 (FIG. 6A) arranged relative to the delimber wall (not shown) to provide the desired field-of-view 123 of a tree 156 while maintaining the camera 140 sufficiently offset and away from the delimber saw 123. Such an arrangement may advantageously keep wood chips, debris and oil from adversely impacting a lens or a face 162 of the camera 140 while still providing the desired field-of-view 123 into the trough 118 of the delimber.

Figure 7:
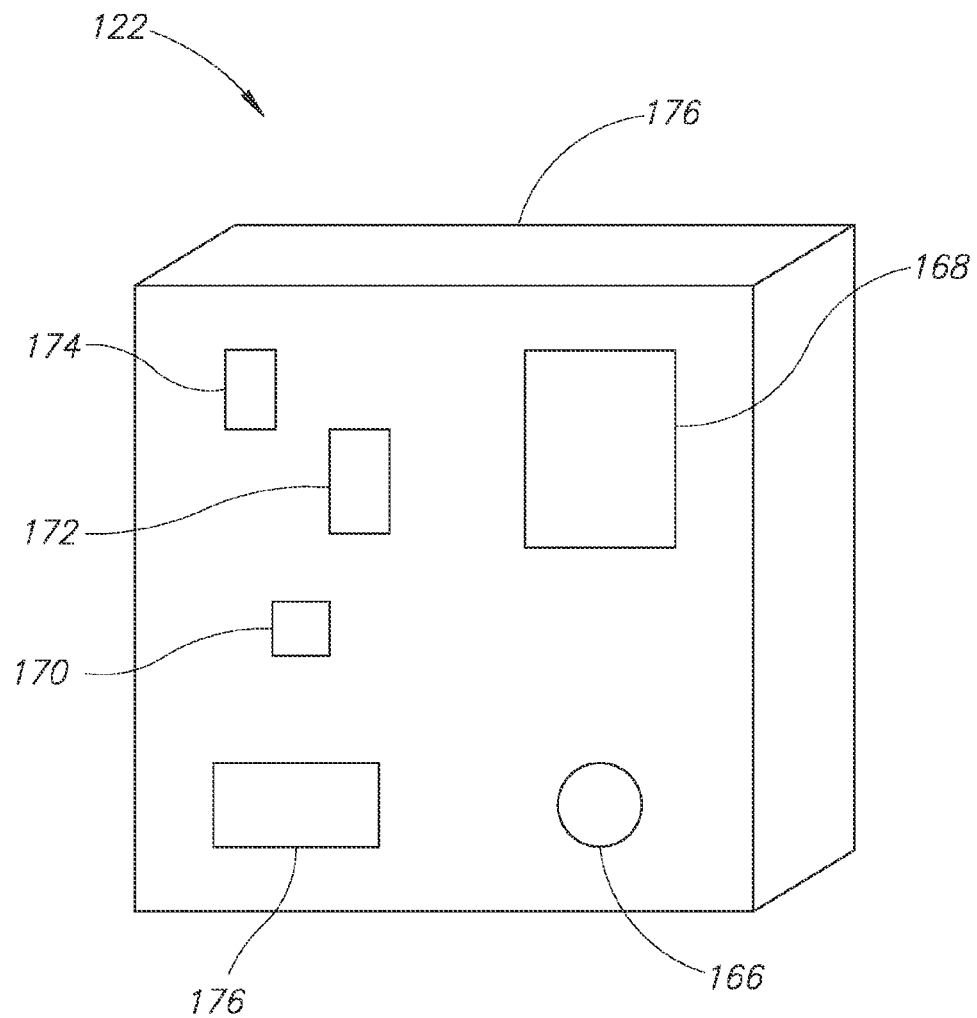
FIG. 7 is a schematic, perspective view of an electronic data box according to an embodiment of the present invention.

FIG. 7 shows the electronic data box 122, which may be attached to the delimber in a vicinity of or distally from the camera system 120 (FIG. 5A). In either mounting configuration, the electronic data box 122 is in data communication with the camera 140 (FIG. 5A) to receive images taken by the camera 140. The transfer of the images and possibly other data from the camera 140 to the electronic data box 122 may be done using cables or wireless signals. One objective of the electronic data box 122 is to provide a communications link between the camera 140 and the display system 112 (FIG. 3) in the loader.

In the illustrated embodiment, the electronic data box 122 includes a port 166 for establishing data communication with the camera 140 via one or more cables (not shown). The electronic data box 122 of the illustrated embodiment further includes a transmitter 168, a voltage detector 170, a microprocessor 172, a shake detection mechanism 174, and an internal power source 176—all of which are preferably located within a housing 178 of the electronic data box 122. In one embodiment, the internal power source 176 may take the form of a battery, and preferably a rechargeable battery. Likewise, the transmitter 168 may take the form of a radio transmitter.

Figure 8:
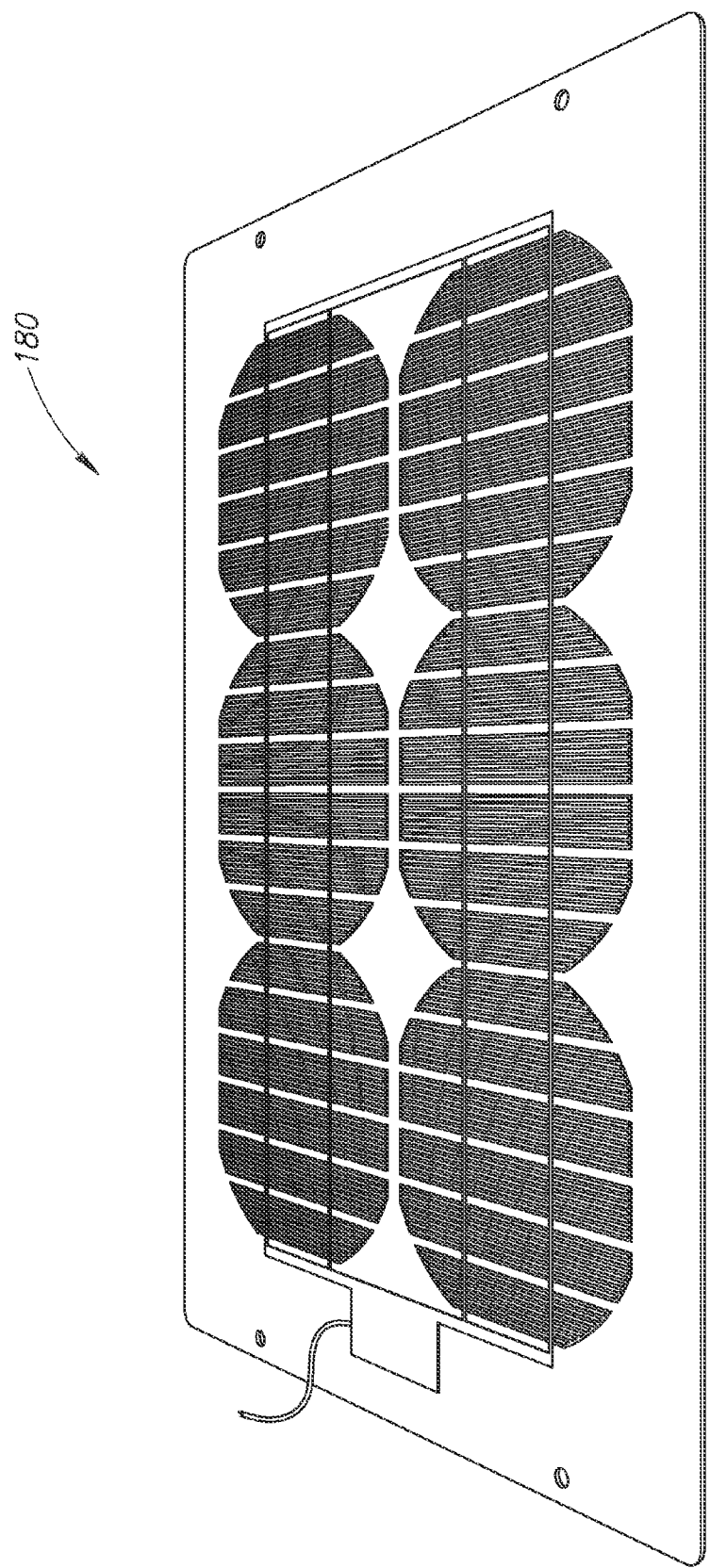
FIG. 8 is perspective view of an external energy source according to an embodiment of the present invention.

In another embodiment, the electronic data box 122 and camera 140 may be additionally or solely powered by an external power source such as a solar panel array 180 as illustrated in FIG. 8. Further, the microprocessor 172 may be configured to communicate with the solar panel array 180. By way of example, the solar panel array 180 may be attached to a portion of the delimber or may be set up far enough away from the delimber as to be out of an impact area for flying debris generated during the delimbing process. The power source for the electronic data box 122 and camera 140 may take other forms such as, but not limited to, solar panels, batteries, generators or any combination thereof. The camera system may be alternately powered by rechargeable storage batteries which are recharged or replaced when depleted. In some embodiments, wires may be connected to the delimber in such a fashion that the power created by the host machine is used to power the measurement system. When the remote camera is attached by wires for power, the function of the radio transmitter and receiver my be replaced by wires. The image is then carried into the cab by the wires. The capacity and/or output of such external power sources may vary depending on a variety of factors such as environment (e.g., cold vs. warm climate), anticipated length of use, delimber size, etc.

The shake detection mechanism 174 may advantageously detect idle times of the delimber and thus limit or otherwise control electrical consumption of the camera and other components to preserve battery life. In one embodiment and still referring to FIG. 7, the shake detection mechanism 174 may take the form of one or more sensors such as, but not limited to, one or more accelerometers configured to detect motion in at least one direction. Activity or inactivity detected by the shake detection mechanism 174 may turn the camera 140 and the electronic data box 122 ON or OFF, respectively. The shake detection mechanism 174 and its circuitry may be located within the housing 178 of the electronic data box 122. When the loader places one or more trees on the delimber, the sensor detects this contact and provides a signal to the microprocessor 172, which in turn prompts the electronic data box 122 to fully awaken and also activates power to the camera 140. The shake detection mechanism 174 may be activated by other means besides the tree loading or unloading. For example, the shake detection mechanism 174 may be activated by a switch either manually or remotely, by a motion or proximity sensor, or a weight bearing (e.g., pressure) sensor.

Referring briefly back to FIG. 3 and according to an embodiment of the present invention, the loader 102 includes the display system 112 configured to receive wireless signals from the electronic data box 122 or directly from the camera 140 (FIG. 5A). The display system 112 may optionally have or be coupled to the wireless receiver or transceiver 114, which may take the form of a radio antenna as discussed above.

Figure 9:
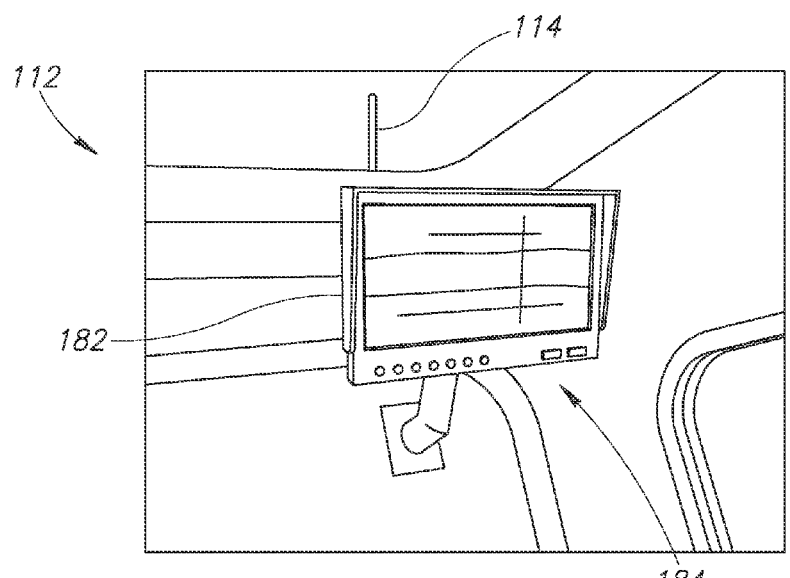
FIG. 9 is a perspective view of a display system according to an embodiment of the present invention.

FIG. 9 shows the display system 112 mounted in the cab of the loader. In one embodiment, the display system 112 includes a display screen 182, a mounting bracket 184, and the receiver 114. The mounting bracket 184 may take the form of a pivoting mounting bracket similar to a wall mount for a television. The receiver 114 may take the form of a device capable of receiving wireless, electronic, or optical signals, which may be encoded signals, as well as any combinations thereof.

Figure 10:
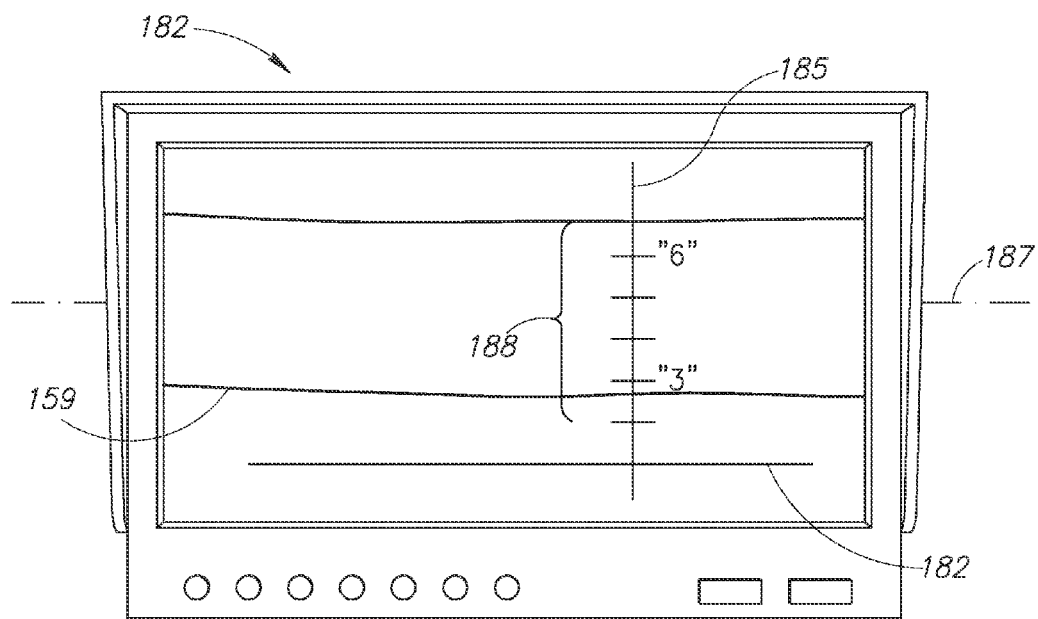
FIG. 10 is a close-up, perspective view of the display system of FIG. 9.

FIG. 10 shows the display screen 182 with a close-up view of the interaction area of the tree 159 before the saw 128 (FIG. 4B) is lowered into a cutting position. The display screen 182 includes a graphical user interface that shows a cut line 185 (i.e., the vertical line), an orientation line 186 (i.e., the line approx. parallel to the tree 159), and one or more markings 188 (e.g., tick marks) for approximately determining a diameter of the tree 159. The cut line 184 indicates to the operator where the saw will cut the tree 159. The orientation line 186 permits the operator to orient the saw cut by maneuvering the tree 159 so the cut will be approximately perpendicular to an axis 187 of the tree 159.

The markings 188 may be colored or differently sized. Such coloring or sizing may be indicative of different or desirable diameter sizes so the operator will know whether to horizontally adjust the tree 159 using the loader 102 (FIG. 3). In addition, one or more characters 190, which may take the form of alphanumeric characters, may be displayed adjacent or in proximity to the respective markings 188 as confirmation to the operator that a particular marking 188 indicates a particular diametric size. For example in the illustrated embodiment, the numerals "3" and "6" would represent a three-inch diameter and a six-inch diameter, respectively.

Figure 11:
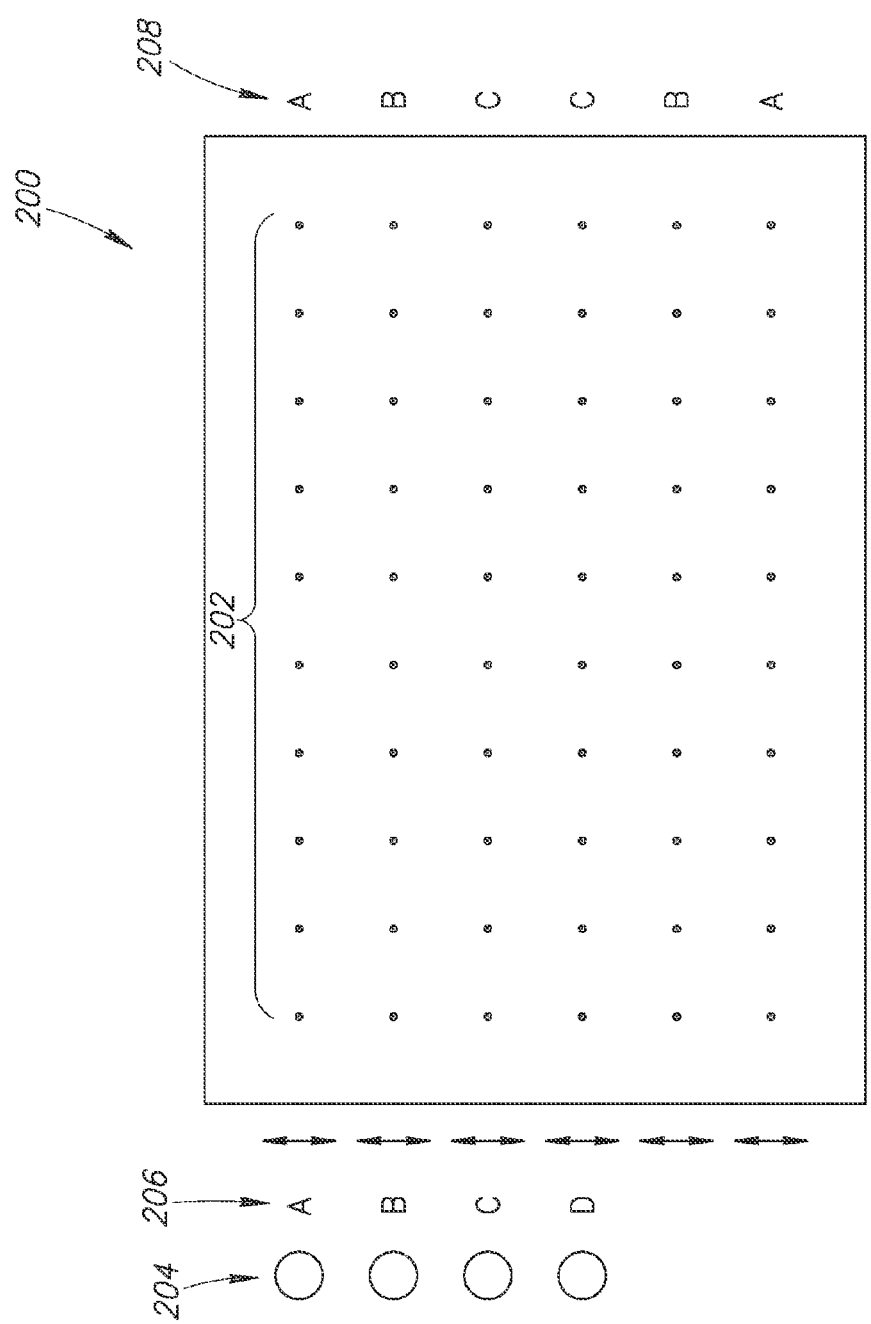
FIG. 11 is a schematic view of a graphical user interface for the display system of FIG. 9 according to an embodiment of the present invention.

FIG. 11 shows a display screen 200 having a different graphical user interface in accordance with another embodiment of the present invention. The display screen 200 shows a pattern of gauge markings 202 arranged both horizontally and vertically. In the illustrated embodiment, the gauge markings 202 may take the form of dots or short dashes. On a left side of the display screen 200, the graphical user interface provides a plurality of circles 204 that are indicative of a particular tree diameter. Adjacent to the circles 204 are respective reference letters or numbers 206 that have corresponding reference letters or numbers 208 illustrated on a right side of the display screen 200.

Figure 12:
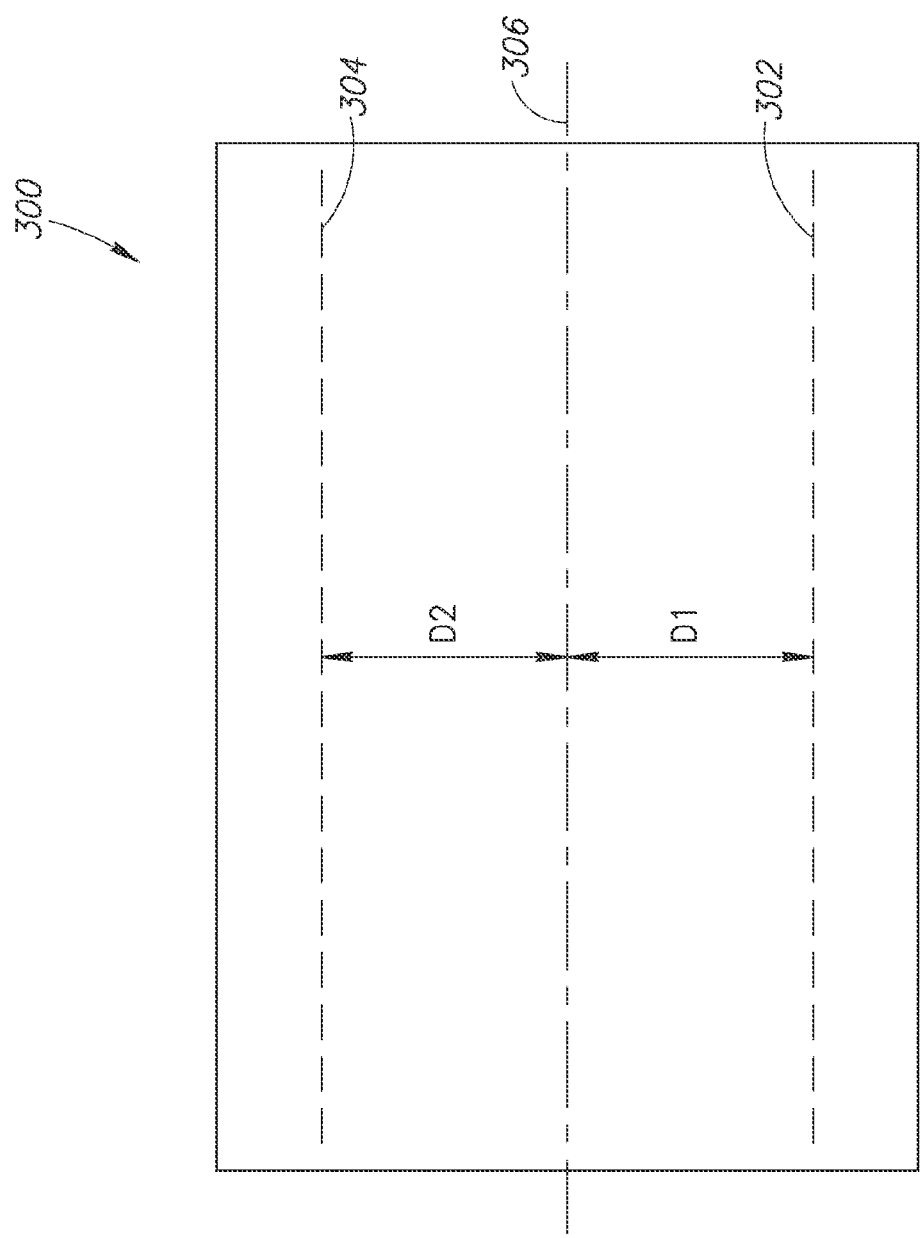
FIG. 12 shows a monitor with gauge lines according to an embodiment of the present invention.

FIG. 12 shows a schematic front view of a monitor 300 having adjustable gauge lines 302, 304 relative to a reference line 306. In operation, the operator compares the image of the stick (not shown) in the delimber to the lines on the monitor 300 to gauge the relative diameter of the stick.

Figure 13:
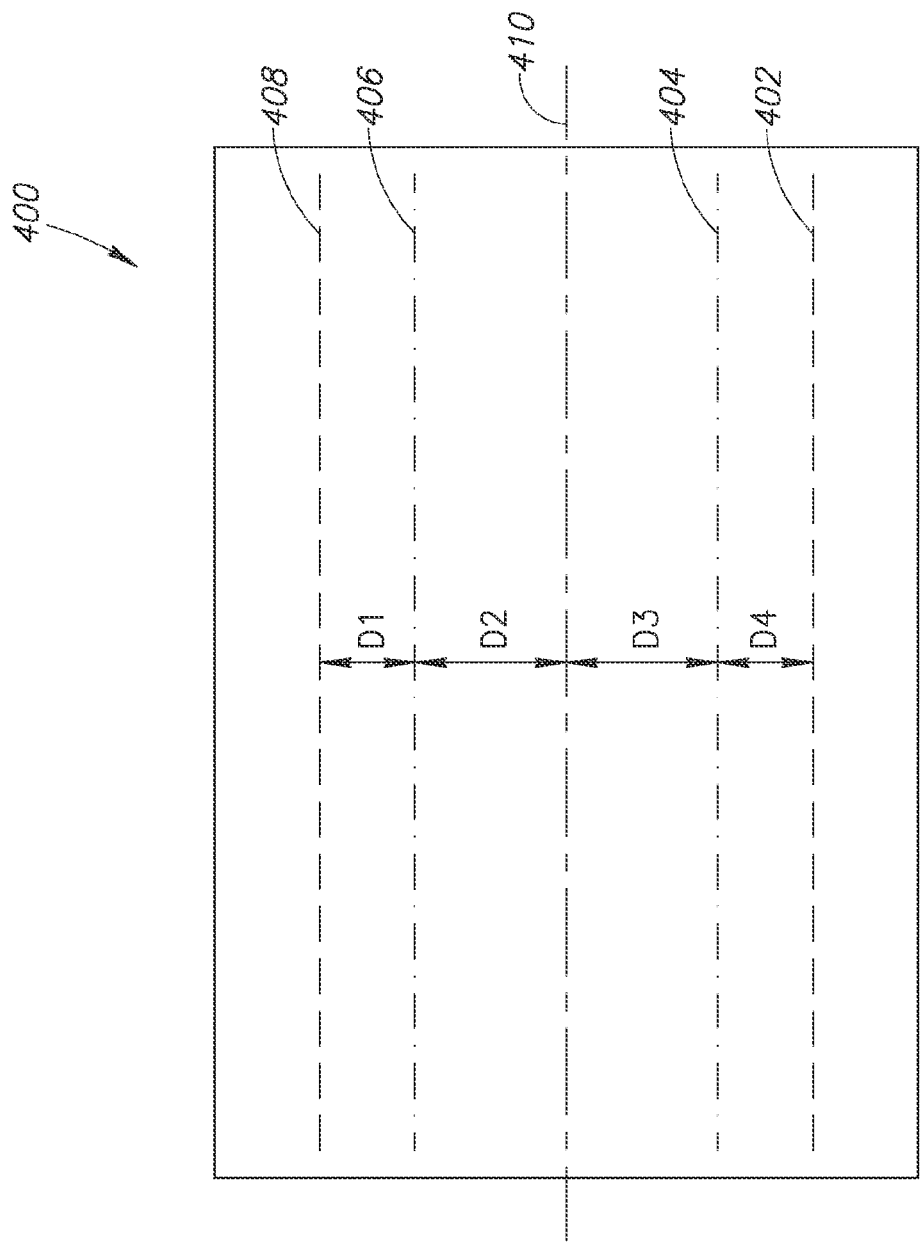
FIG. 13 shows a monitor with gauge lines according to another embodiment of the present invention.

FIG. 13 shows a schematic front view of another monitor 400 having adjustable gauge lines 402, 404, 406, and 408 relative to a reference line 410. In operation, the operator compares the image of the stick (not shown) in the delimber to the lines on the monitor 300 to gauge the relative diameter of the stick. In the illustrated embodiment, the operator has an option to select one of four different stick diameters as indicated by diameter markings D1, D2, D3, and D4, respectively. The plurality of lines may allow the operator the choice of topping the stick at an optimum diameter.

Operators have considerable skill in the recognition of defects in the stick, and determination of the diameter. The operator uses the boom to center the stick in the field of view of the camera, by watching the image presented by the camera on the screen. Referring to both FIGS. 12 and 13, the gauge lines on the monitors may be set to represent actual inch measurements regardless of the monitor size. Thus the lines on the screen allow the operator to determine the diameter of the stick. For example, a ruler or an object of a know diameter may be placed in the field of view of the camera. This reference ruler or object allows the operator to adjust the lines and/or move the stick to achieve a desired diameter at the interaction point with the saw. The lines are used to determine the diameter relative to the picture on the display. The operator also uses the display to inspect the stick for defects, such as breaks or knots, and position the stick so the saw line leaves the defect on the scrap side of the stick. A line drawn on the display, either electronically or mechanically shows the interaction point at which the saw will cut the tree. So the operator is actually making a decision based on the diameter, as gauged against the lines on the monitor, and can quickly make a decision on where to saw the stick based on the observed information.

Figure 14:
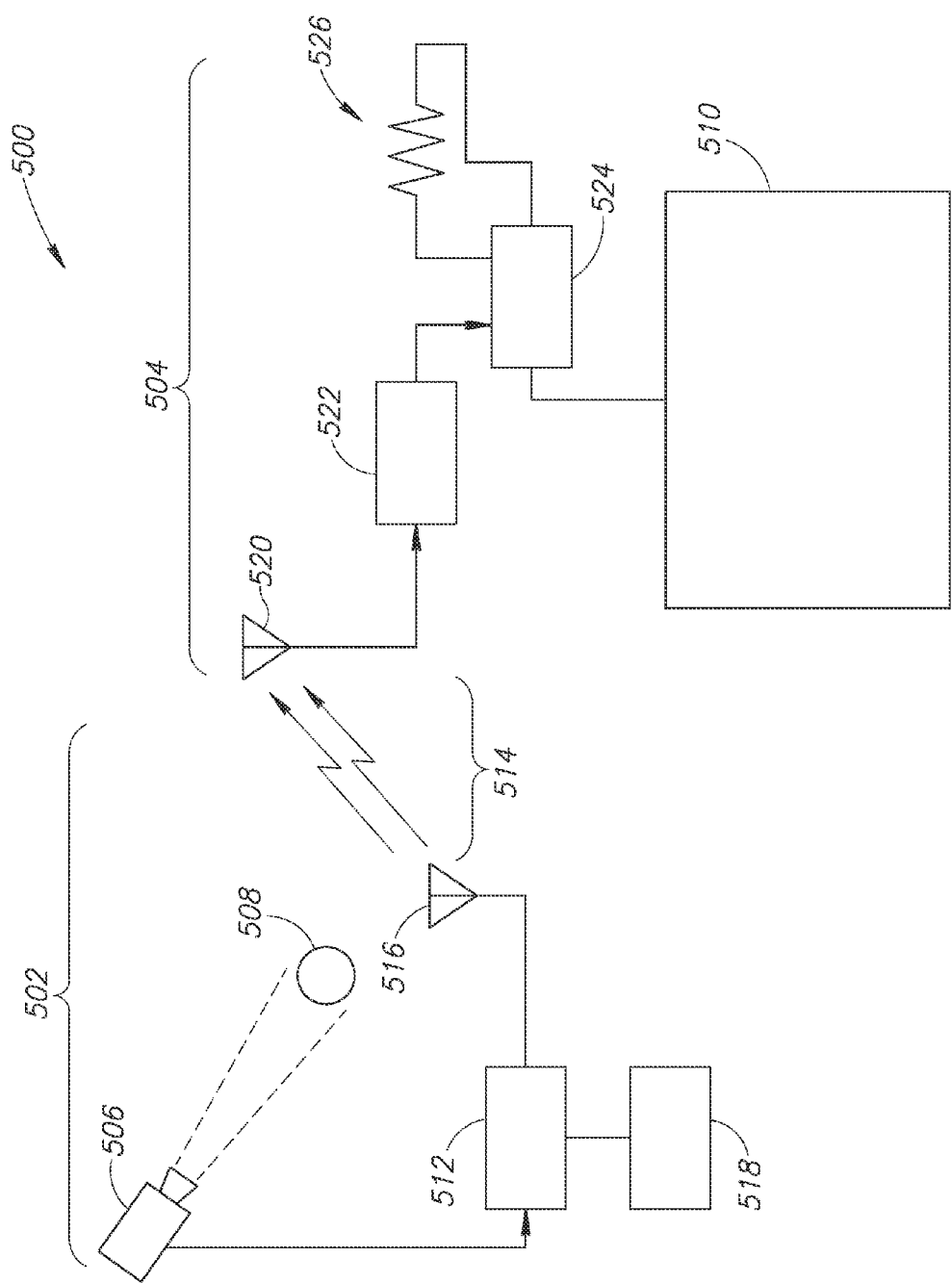
FIG. 14 shows a schematic overview diagram of a tree harvesting system according to an embodiment of the present invention.

FIG. 14 shows a schematic diagram of a tree harvesting system 500 having a delimbing system 502 and a remotely located loader 504. The delimbing system 502 includes a camera 506 viewing a stick 508 with a representative image shown on a monitor 510. The camera 506 communicates with an electronic data or control box 512, which in turn receives image information from the camera 506 and then transmits the image information as radio signals 514 from a delimbing system antenna 516. Both the camera 506 and control box 512 may be powered by a power source 518.

The loader 504 includes a loader antenna 520 configured to receive the radio signals 514, which in turn may be sent to a receiver 522. A loader data box 524 processes the data from the receiver 522 and utilizes a gauge line control circuit 526 to manage or control the gauge lines on the monitor 510.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A pull-through delimbing system for a tree harvester, the delimbing system comprising:
    a saw for cutting a tree;
    a camera arranged to capture an interaction point between the saw and a portion of the tree;
    a display system configured to receive image data from the camera;
    a processor configured to receive the image data and determine at least one physical parameter related to the portion of the tree that allows an operator of the delimbing system to choose where to cut the portion of the tree; and
    a motion detection sensor in communication with the processor and configured to detect start-up and shut-down times of at least one of the saw and the tree harvester.

2. The delimbing system of claim 1, wherein the at least one physical parameter includes a diameter of the portion of the tree to be cut.

3. The delimbing system of claim 1, wherein the wherein the at least one physical parameter includes a length of the portion of the tree to be cut.

4. The delimbing system of claim 1, wherein the display system is configured to show a real-time image of the interaction point between the saw and the portion of the tree and further configured to simultaneously show the at least one physical parameter determined by the processor.

5. The delimbing system of claim 1, wherein the display system is configured to show markings that provide a simulated version of the at least one physical parameter.

6. The delimbing system of claim 1, further comprising a power system to supply electricity to at least the camera and the processor.

7. The delimbing system of claim 6, further comprising a charger to recharge the power system.

8. The delimbing system of claim 6, wherein the power system includes a solar panel array.

9. The delimbing system of claim 1, wherein the camera includes a radio transmitter to send the image data to the processor.

10. The delimbing system of claim 1, further comprising a mounting system for the camera, the mounting system controllable by the operator to orient and maintain a field of view of the camera.

11. The delimbing system of claim 10, wherein the mounting system for the camera includes a maneuverable housing.

12. The delimbing system of claim 1, wherein the motion detection sensor is configured to detect contact between the harvester and the tree.

13. The delimbing system of claim 1, wherein the motion detection sensor is an accelerometer configured to detect vibration at a pre-determined frequency or amplitude.

* * * * *